United States Patent [19]

Melicque

[11] 4,316,675
[45] Feb. 23, 1982

[54] DEVICE FOR FASTENING STUD BOLTS

[75] Inventor: Gaston E. E. Melicque, Mennecy, France

[73] Assignee: Societe Nationale d'Etude et de Construction de Moteurs d'Aviation, "S.N.E.C.M.A.", Paris, France

[21] Appl. No.: 165,987

[22] Filed: Jul. 7, 1980

[30] Foreign Application Priority Data

Jul. 27, 1979 [FR] France ............................ 79 19400

[51] Int. Cl.³ .................. B25G 3/00; E21B 19/16; F16D 1/00
[52] U.S. Cl. .................................................. 403/22
[58] Field of Search ................ 403/22, 388, 188, 408; 52/562; 411/113, 116, 119, 120

[56] References Cited

U.S. PATENT DOCUMENTS

| | | | |
|---|---|---|---|
| 1,448,555 | 3/1923 | McGill | 411/190 |
| 1,592,627 | 7/1926 | Egleston | 411/330 |
| 1,931,011 | 10/1933 | Richardson et al. | 411/113 |
| 2,140,628 | 12/1938 | Hoff | 105/249 |
| 2,144,553 | 1/1939 | Simmonds | 411/111 |
| 2,401,824 | 6/1946 | Gladden et al. | 411/113 |
| 2,405,925 | 8/1946 | Poupitch | 411/113 |
| 2,550,867 | 5/1951 | Rosan | 411/116 |
| 3,493,026 | 2/1970 | Donofrio et al. | 411/120 |

FOREIGN PATENT DOCUMENTS 855184  5/1940  France ........................... 403/22

Primary Examiner—Wayne L. Shedd
Attorney, Agent, or Firm—Bacon & Thomas

[57] ABSTRACT

A structural element has a bridge plate secured to it with a median wall of the bridge plate spaced from the structural element and lateral walls from the median wall to the element. Each of the walls has an opening and a plate has wings extending into the opening of the lateral walls and a castellated opening aligned with the opening of the median wall. A castellated nut seats in the castellated opening and has a flange or collar between the brace and the median wall.

3 Claims, 3 Drawing Figures

U.S. Patent  Feb. 23, 1982  4,316,675
FIG. 1
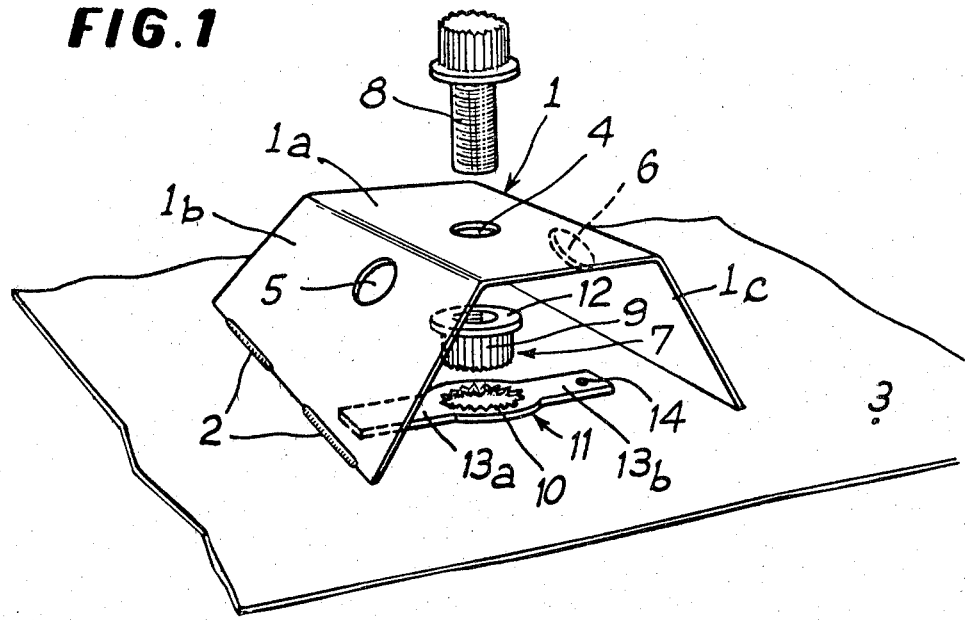
FIG. 2
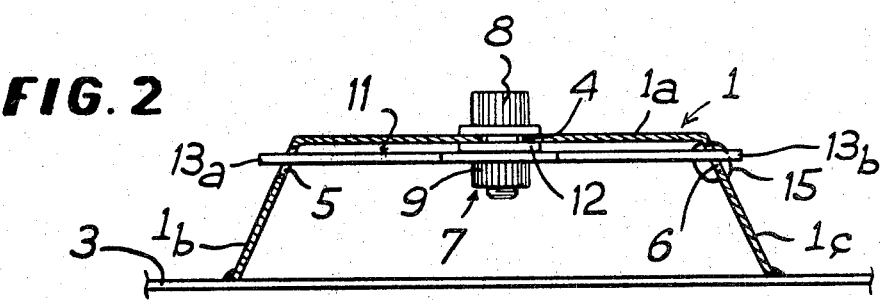
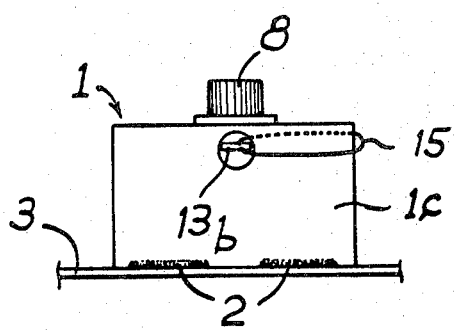
FIG. 3

DEVICE FOR FASTENING STUD BOLTS

BACKGROUND OF THE INVENTION

Captive nuts used in assemblies intended for frequent disassembly (for maintenance, inspection, etc.) are generally fastened by means of a fastener device or by welding, to a small plate which itself is welded, riveted or fastened to the support element.

When self-locking nuts are involved, this arrangement presents a serious disadvantage for maintenance. In fact, they must be replaced frequently and it is then necessary to use a special tool to open the tightened parts and a drill or a manual cutter to eliminate the rivets or the welded spots.

However, these operations often require alterations which make it necessary to use pieces having special dimensions, in order to effect repairs. Furthermore, it should be noted that when nuts are welded to a plate, the welds must be inspected by means of radiography.

SUMMARY OF THE INVENTION

It is the object of the present invention to provide a captive nut fastening device without the disadvantages mentioned hereinabove.

According to the invention, a bridge plate comprising a median wall and two lateral walls, each containing a hole, is mounted on the structural element, the hole of the median wall being located in alignment with the threaded hole of the nut intended to receive the threaded part of a threaded bolt and immobilized with respect to rotation in a plate comprising two opposing wings engaging the holes machined into the lateral walls of the bridge plate, said nut having a collar which fits between the median wall and the plate. This arrangement makes it possible to replace the captive nut without special tools.

Furthermore, the use of a retaining wire aids in retaining the plate in place during disassembly.

BRIEF DESCRIPTION OF THE DRAWINGS

Other characteristics and advantages of the invention will be understood better by the description following hereinbelow of a mode of embodiment and by referring to the drawings attached hereto.

In the drawing

FIG. 1 is a perspective view of the captive nut fastening device, with the pieces displayed prior to mounting;

FIG. 2 is an axial section of the captive nut fastening device with parts shown in elevation; and FIG. 3 is a side elevation of the captive nut fastening device.

DESCRIPTION OF A PREFERRED EMBODIMENT

FIGS. 1, 2 and 3 show an embodiment of a captive nut fastening device according to the invention. The device comprises a bridge plate 1 mounted specifically by means of spot welds 2 on a plate 3 of a given structure.

The bridge plate 1 comprises a median wall 1a and two lateral walls 1b and 1c, which contain, respectively, the holes 4, 5 and 6. The threaded hole of a self-locking nut 7 is aligned with the hole 4 of the bridge plate 1; said nut being provided to receive the threaded part of the threaded bolt 8. The nut 7 is provided with teeth 9 engaging the hole 10 of a plate 11 having indentations matching the teeth 9, in order to immobilize the nut 7 in rotation.

The nut 7 further is provided at one end with a collar 12, which rests against the median wall 1b of the bridge plate 1 and on the other side against the plate 11, when the two wings 13a, 13b of the plate 11 extend into the holes 5 and 6. In order to maintain the plate 11 in place during a dismounting operation, it is equipped with a hole 14 for a retaining wire 15, which is fitted around the lateral wall 1c of the bracket.

The device is assembled as follows:

By introducing the nut 7 by its toothed part 9 in the corresponding castellated hole 10 of the plate 11, an assembly consisting of the nut mounted on the plate is obtained, said assembly being secured under the bridge plate subsequently, the wings 13a, 13b of the plate 11 are introduced in the holes 5 and 6. With the nut 7 being secured in this manner, it is now possible to screw the threaded bolt 8 into the nut 7. The wire 15 is then engaged in the hole 14 of the plate and fitted around the wall 1c as shown in FIG. 3.

It should be understood that the invention is not limited to the above description and those skilled in the art may resort to modifications without leaving the scope of the invention.

I claim:

1. Device for the fastening of captive nuts to a structural element wherein the structural element has secured thereto a bridge plate comprising a median wall and two lateral walls, each being provided with a hole, said hole of the median wall being aligned with a threaded hole of the nut intended to receive the threaded part of a threaded bolt and immobilized with respect to rotation in a plate comprising two oppositely extending wings engaged in the holes in the lateral walls of the bridge plate, said nut having a collar between the median wall and the plate.

2. Device according to claim 1 wherein the plate is provided with an orifice having castellations engaged by a corresponding toothed part of the nut.

3. Device according to claim 1 or 2 wherein at least one of the wings of the plate is provided with a hole wherein is engaged a retaining wire extending around the lateral wall of the bridge plate.

* * * * *